US011986731B2

(12) United States Patent
Walker et al.

(10) Patent No.: US 11,986,731 B2
(45) Date of Patent: May 21, 2024

(54) DYNAMIC ADJUSTMENT OF IN-GAME THEME PRESENTATION BASED ON CONTEXT OF GAME ACTIVITY

(71) Applicants: Sony Interactive Entertainment LLC, San Mateo, CA (US); Sony Interactive Entertainment Inc., Tokyo (JP)

(72) Inventors: Victoria Walker, San Mateo, CA (US); Olga Rudi, San Francisco, CA (US)

(73) Assignees: Sony Interactive Entertainment LLC, San Mateo, CA (US); Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/864,947

(22) Filed: Jul. 14, 2022

(65) Prior Publication Data
US 2024/0017171 A1    Jan. 18, 2024

(51) Int. Cl.
*A63F 13/537* (2014.01)
*A63F 13/54* (2014.01)
*G11B 27/036* (2006.01)

(52) U.S. Cl.
CPC ............ *A63F 13/537* (2014.09); *A63F 13/54* (2014.09); *G11B 27/036* (2013.01)

(58) Field of Classification Search
CPC .... A63F 13/54; A63F 13/537; A63F 13/5375; G11B 27/036
See application file for complete search history.

(56) References Cited

U.S. PATENT DOCUMENTS

| | | | | |
|---|---|---|---|---|
| 6,786,818 B1* | 9/2004 | Rothschild | .......... | G07F 17/3244 436/16 |
| 2002/0151349 A1* | 10/2002 | Joshi | ....................... | G07F 17/32 463/20 |
| 2003/0195024 A1* | 10/2003 | Slattery | ................... | A63F 13/10 463/16 |
| 2004/0053695 A1* | 3/2004 | Mattice | ............... | G07F 17/3262 463/42 |
| 2004/0142747 A1* | 7/2004 | Pryzby | .................. | G07F 17/323 463/35 |
| 2005/0192085 A1* | 9/2005 | Iwamoto | ............. | G07F 17/3267 463/16 |
| 2005/0239545 A1* | 10/2005 | Rowe | ...................... | G07F 17/32 463/29 |
| 2006/0009285 A1* | 1/2006 | Pryzby | ................... | G07F 17/32 463/30 |
| 2006/0063575 A1* | 3/2006 | Gatto | .................... | G07F 17/323 463/1 |

(Continued)

OTHER PUBLICATIONS

PCT/US2023/069821, International Search Report and Written Opinion, ISA-210/ISA-237, European Patent Office, NL 2280 HV Rijswijk., Oct. 10, 2023.

*Primary Examiner* — Steve Rowland
(74) *Attorney, Agent, or Firm* — Penilla IP, APC

(57) ABSTRACT

A method for enabling visualization of audio content of a video game is provided, including the following operations: executing a session of a video game; activating an audio visualization theme for the session of the video game; responsive to activating the audio visualization theme, then dynamically adjusting gameplay video of the session to include visual elements indicative of audio content of the session; wherein said visual elements are rendered in a designated border region of the gameplay video based on the audio content of the session.

18 Claims, 6 Drawing Sheets

(56) References Cited

U.S. PATENT DOCUMENTS

| | | | |
|---|---|---|---|
| 2006/0068910 A1* | 3/2006 | Schmidt | H04L 67/303 709/203 |
| 2007/0060348 A1* | 3/2007 | Svanas | G07F 17/34 463/31 |
| 2007/0082725 A1* | 4/2007 | Low | G07F 17/3295 463/16 |
| 2008/0102923 A1* | 5/2008 | Esses | G07F 17/34 463/20 |
| 2008/0194315 A1* | 8/2008 | Seelig | G07F 17/32 463/20 |
| 2011/0300925 A1* | 12/2011 | Adiraju | G07F 17/3209 463/25 |
| 2020/0289926 A1 | 9/2020 | Silverstein et al. | |
| 2021/0146237 A1 | 5/2021 | Saville et al. | |

\* cited by examiner

DYNAMIC ADJUSTMENT OF IN-GAME THEME PRESENTATION BASED ON CONTEXT OF GAME ACTIVITY

BACKGROUND

1. Field of the Disclosure

The present disclosure relates generally to dynamic adjustment of in-game theme presentation based on context of game activity.

2. Description of the Related Art

The video game industry has seen many changes over the years. As technology advances, video games continue to achieve greater immersion through sophisticated graphics, realistic sounds, engaging soundtracks, haptics, etc. Players are able to enjoy immersive gaming experiences in which they participate and engage in virtual environments, and new ways of interaction are sought.

It is in this context that implementations of the disclosure arise.

SUMMARY

Implementations of the present disclosure include methods, systems, and devices relating to dynamic adjustment of in-game theme presentation based on context of game activity.

In some implementations, a method for enabling visualization of audio content of a video game is provided, including the following operations: executing a session of a video game; activating an audio visualization theme for the session of the video game; responsive to activating the audio visualization theme, then dynamically adjusting gameplay video of the session to include visual elements indicative of audio content of the session; wherein said visual elements are rendered in a designated border region of the gameplay video based on the audio content of the session.

In some implementations, dynamically adjusting the gameplay video includes receiving sound effect data generated from the session, and using the sound effect data to generate the visual elements that correspond to the sound effect data.

In some implementations, the sound effect data identifies a given sound effect; wherein dynamically adjusting the gameplay video includes rendering a given visual element, corresponding to the given sound effect, in the designated border region of the gameplay video.

In some implementations, the sound effect data further identifies a location of the given sound effect in a virtual environment of the video game; wherein rendering the given visual element is configured to indicate the location of the given sound effect.

In some implementations, the sound effect data further identifies a volume of the given sound effect in a virtual environment of the video game; wherein rendering the given visual element is configured to indicate the volume of the given sound effect.

In some implementations, the designated border region includes one or more of a left border region, a right border region, a top border region, and a bottom border region.

In some implementations, the visual elements include one or more of a predefined color, pattern, or graphics rendered in the designated border region.

In some implementations, the visual elements are rendered with an intensity configured to indicate a volume or intensity of the audio content.

In some implementations, a placement of the visual elements within the designated border region is configured to indicate a directionality of the audio content.

In some implementations, dynamically adjusting the gameplay video includes receiving an audio stream generated from the session, and using the audio stream to generate the visual elements.

In some implementations, a non-transitory computer-readable medium is provided having program instruction embodied thereon that, when executed by at least one computing device, cause said at least one computing device to perform a method for enabling visualization of audio content of a video game, the method including the following operations: executing a session of a video game; activating an audio visualization theme for the session of the video game; responsive to activating the audio visualization theme, then dynamically adjusting gameplay video of the session to include visual elements indicative of audio content of the session; wherein said visual elements are rendered in a designated border region of the gameplay video based on the audio content of the session.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which.

DETAILED DESCRIPTION

The following implementations of the present disclosure provide methods, systems, and devices for dynamic adjustment of in-game theme presentation based on context of game activity.

Broadly speaking, implementations of the present disclosure are drawn to methods and systems for providing an in-game theme for a video game, to better accommodate a user/player that is hard of hearing and to enable such a user to better understand what is happening in the video game. It will be appreciated that those with hearing impairment may not fully appreciate what is happening in a video game as they are not able to adequately hear and comprehend the sounds of the video game. Therefore, it is useful to provide an in-game theme or mode that alters the visual presentation of the video game to provide visual elements and mechanisms which communicate the information that would otherwise be provided by way of such sounds of the video game.

In some implementations, the theme can include a border around the game screen, which changes in color and/or graphics to represent the actions occurring in the game. For example, if something explodes in the scene, the border can pulsate in color, intensity and/or frequency to convey the strength of the sound (which may not be audible by a user due to a handicap, or if the user wants to play w/o sound). In some implementations, other aspects of the game's visual presentation can be adjusted, such as adjusting the text, fonts, colors or modifying content of the gameplay to identify what is happening.

In some implementations, the gaze direction of users can be tracked and a set of predefined keywords, such as "enemy", "healing", etc., are rendered for user selection, with such keywords being paired to button presses on a controller. Then, when a user selects a pre-defined keyword, such as "enemy", for example, with their eyes, an appropriate button (e.g. left button or down button or right button) press is triggered on the controller to indicate to the user from which direction the enemy is coming from. This allows the system to provide hints based on gaze detection of the user without overloading the screen with multiple commands.

With the above overview in mind, the following provides several example figures to facilitate understanding of the example embodiments.

Figure 1:
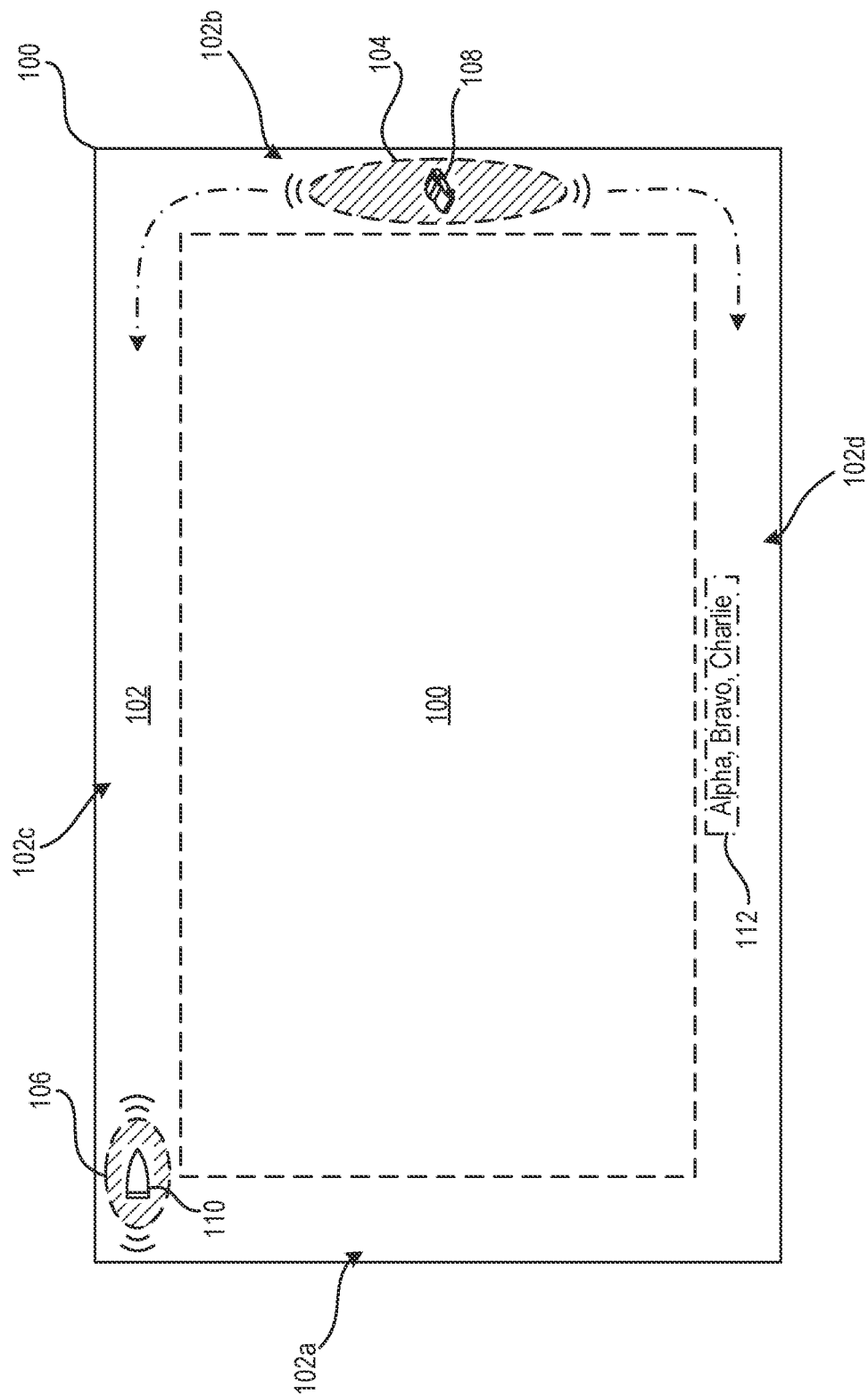
FIG. 1 conceptually illustrates gameplay video of a video game having an in-game audio visualization theme applied, in accordance with implementations of the disclosure.

FIG. 1 conceptually illustrates gameplay video of a video game having an in-game audio visualization theme applied, in accordance with implementations of the disclosure.

The audio visualization theme is a mode which can be activated to enable modification of the gameplay video to present visual elements that indicate the sounds of the video game during gameplay.

In the illustrated implementation, the gameplay video 100 is modified to include a border region 102 that is designated for providing the visual elements enabling visualization of the audio content of the video game. It will be appreciated that the gameplay video is dynamically adjusted to include such visual elements which are indicative of the audio content of the video game during gameplay. And by providing such visual elements in the designated border region 102, a player that cannot adequately hear the audio content of the video game, or simply wishes to play without sound, can comprehend the audio content by way of the visual elements being presented.

In some implementations, the border region 102 (or a portion thereof) is configured to change in color and/or graphics to represent the actions occurring in the game. By way of example without limitation, the border region 102 can display one or more predefined colors, patterns or graphics that are correlated to sounds occurring during the gameplay. In some implementations, such displays may flash or pulsate or otherwise vary in some manner to indicate the strength of the sound. For example, if something explodes in the scene, the border region 102 can pulsate in color, intensity and/or frequency to convey the strength of the sound. It will be appreciated that the presentation of visual elements in the border region 102 is synchronized to sounds and/or audio content of the gameplay which occur in real-time.

In some implementations, the border region 102 is divided into multiple regions, such as a left border region 102a, a right border region 102b, a top border region 102c, and a bottom border region 102d. Different regions of the border can be configured to indicate the location/direction from which a sound is coming. For example, rendering of a visual element 104 in the right border region 102b may indicate that a sound is coming from the right of the player's position in the virtual environment of the video game. Likewise, rendering of a visual element in the left border region 102a may indicate that a sound is coming from the left of the player's position in the virtual environment of the video game. In some implementations, rendering of a visual element in the top border region 102c may indicate that a sound is coming from the front of the player's position in the virtual environment, whereas rendering of a visual element in the bottom border region 102d may indicate that a sound is coming from behind the player's position in the virtual environment. It will be appreciated that further granularity in terms of directionality/location of sound can be provided by configuring the placement of visual elements to indicate the direction from which a sound emanates. For example, in the illustrated implementation, placement of the visual element 106 in the top left portion of the border region 102 can indicate that a sound is coming from the front left of the player's position in the virtual environment of the video game.

As noted, visual elements can be configured to pulsate or may be otherwise animated, possibly to indicate volume or strength or intensity of the sound. In some implementations, visual elements can be animated so as to appear to move. For example, the visual element 104 may be a color that is animated so as to spread/move from right to left along the border region 102. Such an animation can be configured to indicate the sound growing in volume/intensity, or the sound moving (e.g. sound moving from player's right to left).

In some implementations, specific visual elements such as graphics, colors, patterns, etc. are correlated to specific sound sources, so as to indicate to the player what kind of sound is being represented by a given visual element. For example, the color red may be correlated to weapons fire, whereas the color green may be correlated to a vehicle sound. In some implementations, particular graphics are provided to indicate the type of sound. For example, in the illustrated implementation, a graphic 108 of a car indicates that the sound represented by the visual element 104 is that of a car. Whereas the graphic 110 of a bullet indicates that the sound represented by the visual element 106 is that of a bullet/bullets. As noted above, the animation of the visual elements 104 or 106 can be configured to indicate movement of the corresponding sounds of the car or bullet, and the direction of such movement (e.g. left to right, front to back, etc.).

In some implementations, captioning of dialogue or speech can be presented, such as is shown at reference 112 in the illustrated implementation. Along with the captioning, a visual indicator such as the visual elements described above can be configured to indicate the location/direction from which the dialogue/speech is coming. The aforementioned animations of the visual elements may further indicate the intensity of the speech. In some implementations, different colors/patterns/graphics of the visual elements can be utilized to indicate who is speaking.

In some implementations, the border region 102 (or a portion thereof) and/or visual elements presented in the border region 102 can be rendered in the gameplay video as an overlay over the border portions of a game view depicted in the gameplay video. In other implementations, the border region 102 (or a portion thereof) is defined as a reserved area for displaying the presently described audio visualizations, and the game view is depicted within or otherwise separate from the border region 102.

Figure 2:
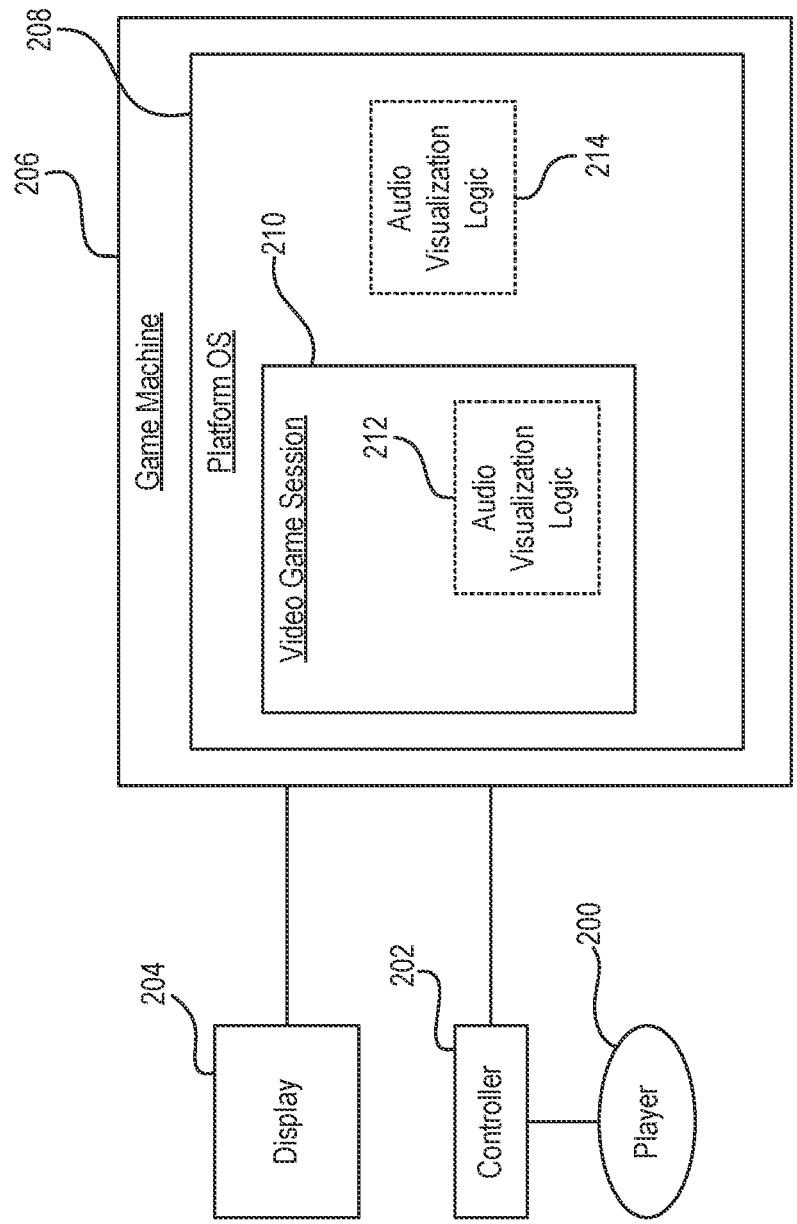
FIG. 2 conceptually illustrates a system for providing an audio visualization in-game theme for a video game, in accordance with implementations of the disclosure.

FIG. 2 conceptually illustrates a system for providing an audio visualization in-game theme for a video game, in accordance with implementations of the disclosure.

In the illustrated implementation, a player 200 engages in a gameplay of a session 210 of a video game executed by a game machine 206. Examples of game machine 206 include, by way of example without limitation, a computer, game console, laptop, desktop computer, set-top box, tablet, mobile device, cellular phone, cloud gaming machine/computer, etc. In some implementations, the player 200 operates a controller 202 to provide user input to the session 210, which is processed and applied for gameplay of the video game. The session 210 renders gameplay video that is presented by a display 204. Examples of display 204 include, by way of example without limitation, a television, monitor, LED/LCD display, projector, head-mounted display (HMD, also known as a virtual reality (VR) headset), etc. It will be appreciated that in cloud-gaming implementations, gameplay is streamed over the Internet, such that the game machine 206 is accessed over the Internet via a thin client device local to the player 200, which transmits the user input to, and receives gameplay video and audio streams from, the game machine 206.

In some implementations, audio visualization logic 212 is defined as part of the video game. That is, audio visualization logic 212 is executed as part of the session 210 of the video game, and the audio visualization logic 212 is configured to adjust the gameplay video rendered by the session 210 in accordance with embodiments described herein providing audio visualization such as by presenting visual elements indicative of audio content of the video game session 210. In some implementations, the audio visualization logic 212 is part of the game engine for the video game.

In some implementations, the audio visualization logic is defined as part of the platform operating system 208 of the game machine 206, as shown at reference 214. The audio visualization logic 214 can be part of a library or API of the platform OS, which may be invoked by the session 210 when the audio visualization theme is activated, to provide the presentation of the visual elements indicating the sounds or audio content as described above.

Broadly speaking the audio visualization logic receives data indicating what audio/sounds are being rendered, or the rendered audio itself, and processes this information to determine what kind of audio visualization will be provided, such as via presentation of visual elements in the border region as discussed above. In some implementations, the audio visualization logic receives sound effect data indicating what sound effects are being used in the gameplay, and applies corresponding visual elements to the player's game view as described herein. In some implementations, the sound effect data includes information such as volume/intensity of a given sound effect, and a location/direction of the sound effect. In some implementations, the audio visualization logic receives and analyzes rendered gameplay audio stream of the video game session, and generates visualizations accordingly.

Figure 3:
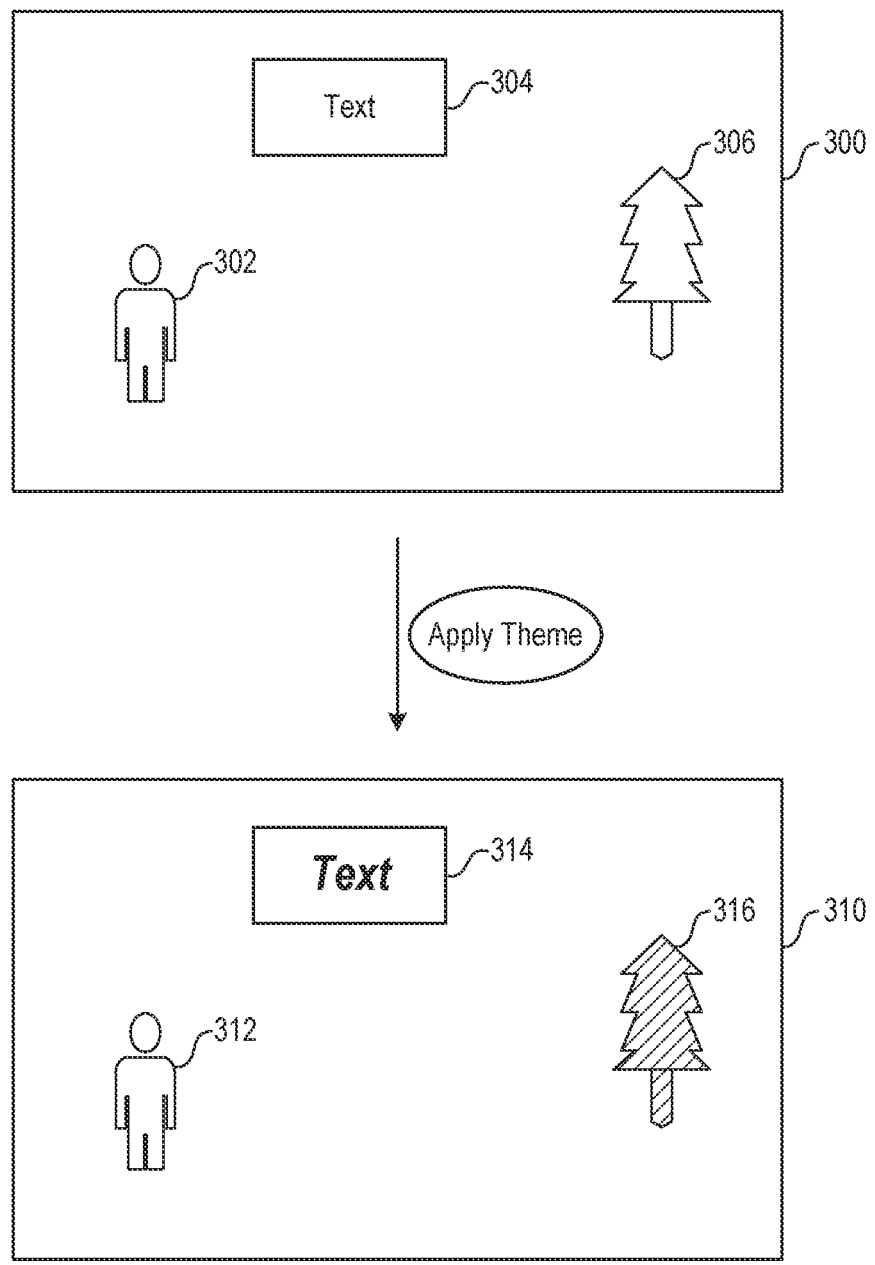
FIG. 3 conceptually illustrates application of an in-game theme to a video game scene, in accordance with implementations of the disclosure.

FIG. 3 conceptually illustrates application of an in-game theme to a video game scene, in accordance with implementations of the disclosure.

In some implementations, various other aspects of a video game's visual presentation can be adjusted, such as adjusting the text, fonts, colors or modifying content of the gameplay to identify what is happening. For example, in the illustrated implementation, a game scene 300 is shown in a native state, without applying an in-game theme. The game scene 300 includes various elements such as a character 302, a virtual object 304 having text written thereon, and a tree 306.

To enhance understanding of the game scene 300 by a user with a disability, an in-game theme can be applied, resulting in the game scene 310, in which elements of the game scene 300 have been modified/adjusted according to the in-game theme. As shown in the game scene 310, the font of the text shown on virtual object 314 has been changed as compared to that of virtual object 304. Also, the depiction of the tree 316 is altered, such as by changing its color, flashing/pulsing, or otherwise altering its appearance to draw attention.

Such changes according to the in-game theme can enhance understanding of the game scene for a player with a disability. For example, by enhancing the appearance of text on the virtual object 314 and altering the appearance of tree 316, a player with visual impairment can better see and appreciate the importance of these portions of the game scene.

As another example, suppose that sound is coming from the tree 306 in the game scene 300. A player with hearing impairment might focus more on elements such as the character 302 and not realize that sound is coming from the tree 306. However, by applying the in-game theme and presenting tree 316 with an altered appearance in the game scene 310, then the attention of the player is drawn to the tree 316. In this manner, the player with hearing impairment is aided in appreciating and comprehending what is happening in the game.

Figure 4:
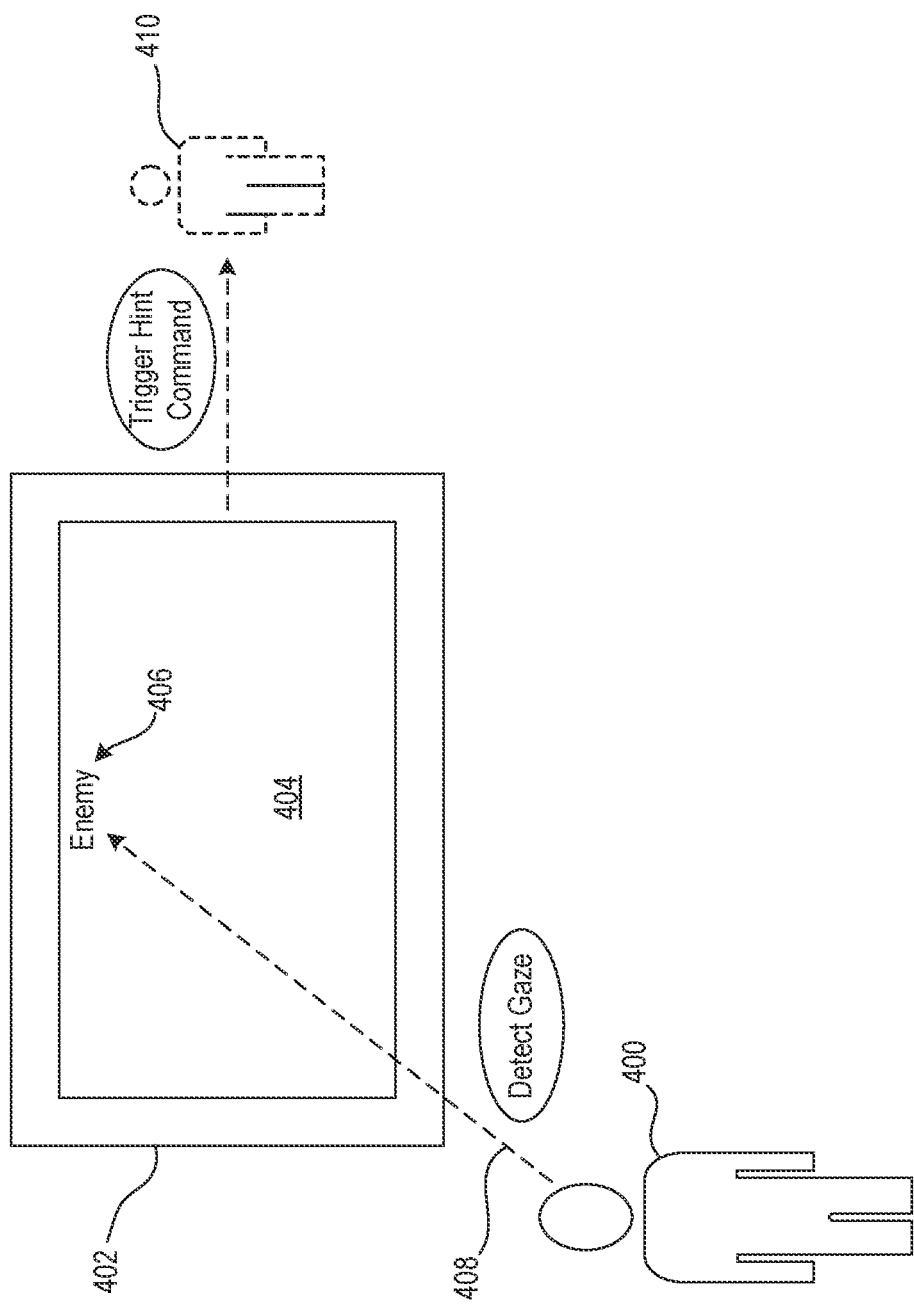
FIG. 4 conceptually illustrates automatic triggering of game commands to provide hints to a player, in accordance with implementations of the disclosure.

FIG. 4 conceptually illustrates automatic triggering of game commands to provide hints to a player, in accordance with implementations of the disclosure.

In the illustrated implementation, a player 400 is engaged in gameplay of a video game, with the gameplay video depicting a game scene 404 being presented on a display 402. In some implementations, the gaze direction 408 of the player 400 is tracked, such as by using an external camera or other gaze tracking technology. A set of predefined keywords, such as "enemy", "healing", etc., can be rendered for user selection based on their gaze. Such keywords are paired to game commands capable of providing hints to the player when the keyword is selected. In some implementations, such commands may correspond to inputs on a controller (e.g. button presses), and the keywords are thus paired to the controller inputs.

By way of example in the illustrated implementation, there is an enemy character 410 located to the right of the player's current view of the game scene 404. When the player 400 selects the pre-defined keyword "Enemy" (shown at reference 406) with their eyes (e.g. by continuously looking at the keyword for greater than a predetermined amount of time, such as 0.5 second or 1 second, etc.), an appropriate command (e.g. right button press) is triggered on the controller to indicate to the user from which direction the enemy is coming. In this case, the command turns/moves the player's view or avatar to the right, indicating that there is the enemy 410 located to the right. In this manner, the system provides hints based on gaze detection of the user without overloading the screen with multiple commands.

In some implementations, the keywords are rendered in the player's view at appropriate times during the gameplay, based on the current game state when the system determines that a given keyword is appropriate for the player's current situation. For example, the keyword "Enemy" is shown when an enemy character or entity that the player cannot see is approaching. In this manner, the system makes hints available to the player when they would be useful for the gameplay, which can be especially helpful for a player that is hearing-impaired and unable to appreciate audio cues in the game.

Figure 5:
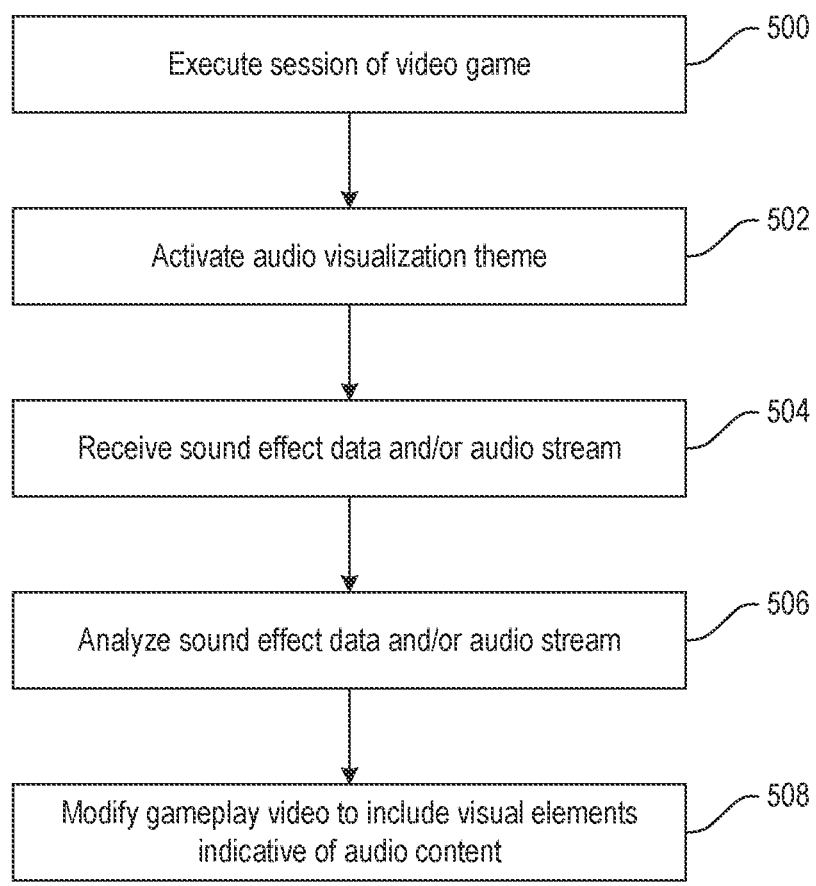
FIG. 5 conceptually illustrates a method for enabling visualization of audio content of a video game.

FIG. 5 conceptually illustrates a method for enabling visualization of audio content of a video game.

At method operation 500, a session of a video game is executed. At method operation 502, an audio visualization theme is activated for the session of the video game. At method operation 504, sound effect data and/or a gameplay audio stream is received. At method operation 506, the sound effect data and/or gameplay audio stream is analyzed to determine a corresponding audio visualization to provide. At method operation 508, the gameplay video of the video game session is modified to incorporate the corresponding audio visualization which is indicative of the audio content of the game. In some implementations, this can include rendering visual elements indicative of the audio content as described above.

Figure 6:
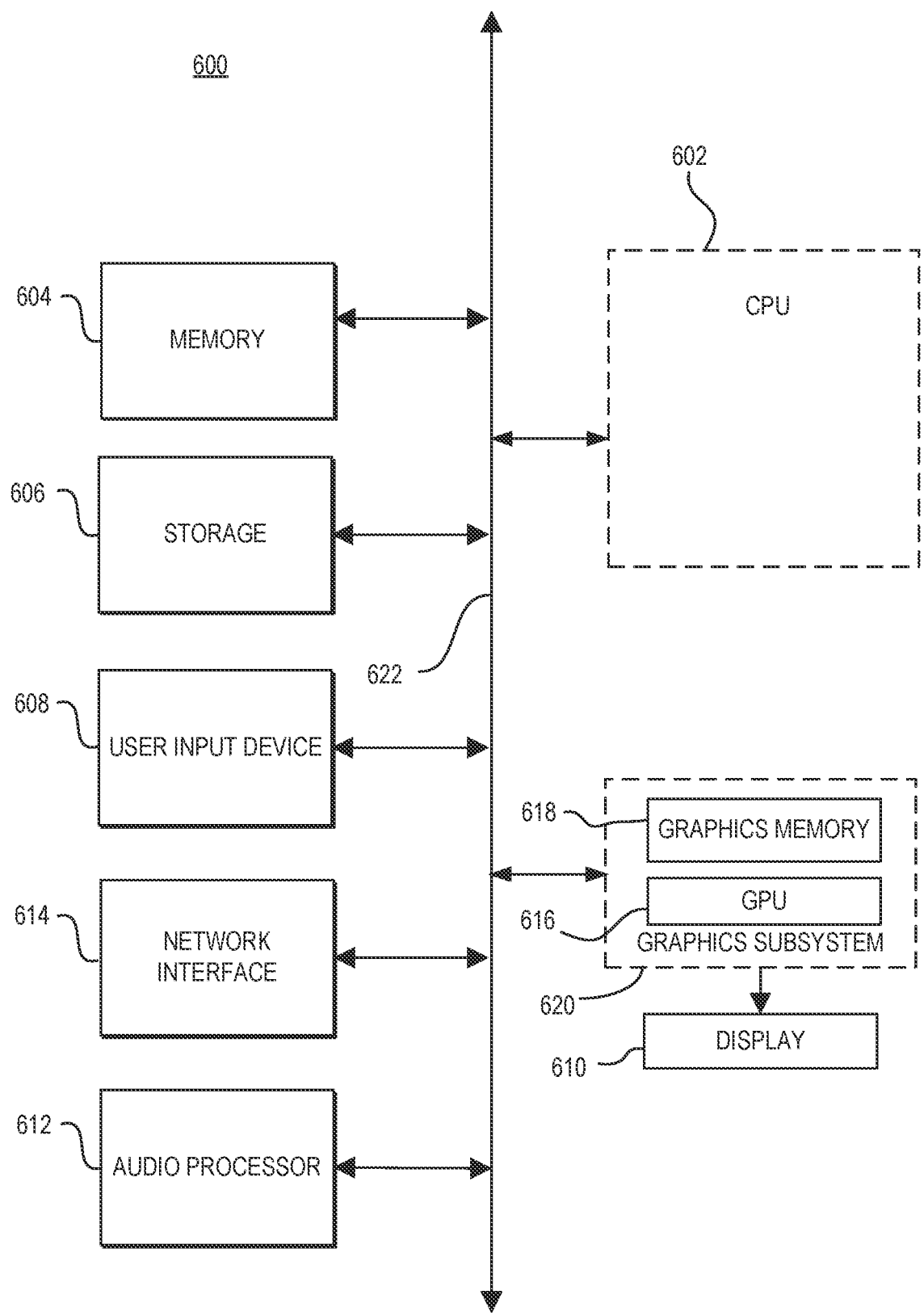
FIG. 6 illustrates components of an example device that can be used to perform aspects of the various embodiments of the present disclosure.

FIG. 6 illustrates components of an example device 600 that can be used to perform aspects of the various embodiments of the present disclosure. This block diagram illustrates a device 600 that can incorporate or can be a personal computer, video game console, personal digital assistant, a server or other digital device, suitable for practicing an embodiment of the disclosure. Device 600 includes a central processing unit (CPU) 602 for running software applications and optionally an operating system. CPU 602 may be comprised of one or more homogeneous or heterogeneous processing cores. For example, CPU 602 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 600 may be a localized to a player playing a game segment (e.g., game console), or remote from the player (e.g., back-end server processor), or one of many servers using virtualization in a game cloud system for remote streaming of gameplay to clients.

Memory 604 stores applications and data for use by the CPU 602. Storage 606 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 608 communicate user inputs from one or more users to device 600, examples of which may include keyboards, mice, joysticks, touch pads, touch screens, still or video recorders/cameras, tracking devices for recognizing gestures, and/or microphones. Network interface 614 allows device 600 to communicate with other computer systems via an electronic communications network, and may include wired or wireless communication over local area networks and wide area networks such as the internet. An audio processor 612 is adapted to generate analog or digital audio output from instructions and/or data provided by the CPU 602, memory 604, and/or storage 606. The components of device 600, including CPU 602, memory 604, data storage 606, user input devices 608, network interface 610, and audio processor 612 are connected via one or more data buses 622.

A graphics subsystem 620 is further connected with data bus 622 and the components of the device 600. The graphics subsystem 620 includes a graphics processing unit (GPU) 616 and graphics memory 618. Graphics memory 618 includes a display memory (e.g., a frame buffer) used for storing pixel data for each pixel of an output image. Graphics memory 618 can be integrated in the same device as GPU 608, connected as a separate device with GPU 616, and/or implemented within memory 604. Pixel data can be provided to graphics memory 618 directly from the CPU 602. Alternatively, CPU 602 provides the GPU 616 with data and/or instructions defining the desired output images, from which the GPU 616 generates the pixel data of one or more output images. The data and/or instructions defining the desired output images can be stored in memory 604 and/or graphics memory 618. In an embodiment, the GPU 616 includes 3D rendering capabilities for generating pixel data for output images from instructions and data defining the geometry, lighting, shading, texturing, motion, and/or camera parameters for a scene. The GPU 616 can further include one or more programmable execution units capable of executing shader programs.

The graphics subsystem 614 periodically outputs pixel data for an image from graphics memory 618 to be displayed on display device 610. Display device 610 can be any device capable of displaying visual information in response to a signal from the device 600, including CRT, LCD, plasma, and OLED displays. Device 600 can provide the display device 610 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In one embodiment, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for enabling visualization of audio content of a video game, comprising:
executing a session of a video game;
activating an audio visualization theme for the session of the video game;
responsive to activating the audio visualization theme, then dynamically adjusting gameplay video of the session to include visual elements indicative of audio content of the session;
wherein said visual elements are rendered in a designated border region of the gameplay video based on the audio content of the session;
wherein a placement of the visual elements within the designated border region is configured to indicate a directionality of the audio content.

2. The method of claim 1, wherein dynamically adjusting the gameplay video includes receiving sound effect data generated from the session, and using the sound effect data to generate the visual elements that correspond to the sound effect data.

3. A method for enabling visualization of audio content of a video game, comprising:
executing a session of a video game;
activating an audio visualization theme for the session of the video game;
responsive to activating the audio visualization theme, then dynamically adjusting gameplay video of the session to include visual elements indicative of audio content of the session;
wherein said visual elements are rendered in a designated border region of the gameplay video based on the audio content of the session;
wherein dynamically adjusting the gameplay video includes receiving sound effect data generated from the session, and using the sound effect data to generate the visual elements that correspond to the sound effect data;
wherein the sound effect data identifies a given sound effect;
wherein dynamically adjusting the gameplay video includes rendering a given visual element, corresponding to the given sound effect, in the designated border region of the gameplay video.

4. The method of claim 3, wherein the sound effect data further identifies a location of the given sound effect in a virtual environment of the video game;
wherein rendering the given visual element is configured to indicate the location of the given sound effect.

5. The method of claim 3, wherein the sound effect data further identifies a volume of the given sound effect in a virtual environment of the video game;
wherein rendering the given visual element is configured to indicate the volume of the given sound effect.

6. The method of claim 1, wherein the designated border region includes one or more of a left border region, a right border region, a top border region, and a bottom border region.

7. The method of claim 1, wherein the visual elements include one or more of a predefined color, pattern, or graphics rendered in the designated border region.

8. The method of claim 1, wherein the visual elements are rendered with an intensity configured to indicate a volume or intensity of the audio content.

9. The method of claim 1, wherein dynamically adjusting the gameplay video includes receiving an audio stream generated from the session, and using the audio stream to generate the visual elements.

10. A non-transitory computer-readable medium having program instruction embodied thereon that, when executed by at least one computing device, cause said at least one computing device to perform a method for enabling visualization of audio content of a video game, the method including the following operations:
executing a session of a video game;
activating an audio visualization theme for the session of the video game;
responsive to activating the audio visualization theme, then dynamically adjusting gameplay video of the session to include visual elements indicative of audio content of the session;
wherein said visual elements are rendered in a designated border region of the gameplay video based on the audio content of the session;
wherein a placement of the visual elements within the designated border region is configured to indicate a directionality of the audio content.

11. The non-transitory computer-readable medium of claim 10, wherein dynamically adjusting the gameplay video includes receiving sound effect data generated from the session, and using the sound effect data to generate the visual elements that correspond to the sound effect data.

12. The non-transitory computer-readable medium of claim 11,
wherein the sound effect data identifies a given sound effect;
wherein dynamically adjusting the gameplay video includes rendering a given visual element, corresponding to the given sound effect, in the designated border region of the gameplay video.

13. The non-transitory computer-readable medium of claim 12, wherein the sound effect data further identifies a location of the given sound effect in a virtual environment of the video game;
wherein rendering the given visual element is configured to indicate the location of the given sound effect.

14. The non-transitory computer-readable medium of claim 12, wherein the sound effect data further identifies a volume of the given sound effect in a virtual environment of the video game;
wherein rendering the given visual element is configured to indicate the volume of the given sound effect.

15. The non-transitory computer-readable medium of claim 10, wherein the designated border region includes one or more of a left border region, a right border region, a top border region, and a bottom border region.

16. The non-transitory computer-readable medium of claim 10, wherein the visual elements include one or more of a predefined color, pattern, or graphics rendered in the designated border region.

17. The non-transitory computer-readable medium of claim 10, wherein the visual elements are rendered with an intensity configured to indicate a volume or intensity of the audio content.

18. The non-transitory computer-readable medium of claim 10, wherein dynamically adjusting the gameplay video includes receiving an audio stream generated from the session, and using the audio stream to generate the visual elements.

\* \* \* \* \*